(12) United States Patent
Babin et al.

(10) Patent No.: US 7,201,335 B2
(45) Date of Patent: Apr. 10, 2007

(54) INJECTION NOZZLE SYSTEM

(75) Inventors: Denis Babin, Ontario (CA); Helen Zhuang, Mississauga (CA)

(73) Assignee: Mold-Masters Limited, Georgetown, Ontario (CA)

( * ) Notice: Subject to any disclaimer, the term of this patent is extended or adjusted under 35 U.S.C. 154(b) by 245 days.

(21) Appl. No.: 10/889,301

(22) Filed: Jul. 13, 2004

(65) Prior Publication Data
US 2005/0031728 A1   Feb. 10, 2005

Related U.S. Application Data

(63) Continuation of application No. 10/110,198, filed as application No. PCT/CA00/01235 on Oct. 17, 2000, now Pat. No. 6,789,745.

(30) Foreign Application Priority Data
Oct. 18, 1999   (CA) .................................. 2286953

(51) Int. Cl.
*B05B 1/04* (2006.01)
*B05B 1/00* (2006.01)
(52) U.S. Cl. .................. 239/600; 239/589; 239/590; 239/592; 239/593; 239/594
(58) Field of Classification Search ................ 239/600, 239/589, 592, 593, 594, 590; 425/589
See application file for complete search history.

(56) References Cited

U.S. PATENT DOCUMENTS 3,935,972 A   2/1976   Tsunemoto et al.
4,266,723 A   5/1981   Osuna-Diaz
4,312,630 A   1/1982   Travaglini
4,583,284 A   4/1986   Gellert (Continued)

FOREIGN PATENT DOCUMENTS

CA   2082700   5/1994

(Continued)

OTHER PUBLICATIONS

International Searching Authority "Notification of Transmittal of The International Search Report or the Declaration"—International Search Report for PCT/CA 00/01235; completed Jan. 22, 2001.

*Primary Examiner*—Davis Hwu
(74) *Attorney, Agent, or Firm*—Medler Ferro PLLC (57) ABSTRACT

A nozzle system is provided comprising a nozzle tip supported in a nozzle body with an alignment member. The alignment member has a connection for engaging a corresponding connection located on the nozzle body. The alignment member also has an aperture concentric with the sleeve that has a tapered engagement surface for contacting a tapered engagement surface on the nozzle tip. A first melt channel is defined through the nozzle body and a second melt channel is defined through the nozzle tip. The melt channel in the nozzle tip has a first section that extends along a first axis from an inlet, a second section that extends from the first section at an incline and a third section that extends from the second section parallel to and eccentric with the first axis. The resulting melt channel defines a straight through channel parallel to said first axis from said inlet to said opening.

21 Claims, 7 Drawing Sheets

U.S. PATENT DOCUMENTS

| | | |
|---|---|---|
| 4,786,246 A | 11/1988 | Gellert |
| 4,795,338 A | 1/1989 | Gellert |
| 4,818,217 A | 4/1989 | Schmidt et al. |
| 4,836,766 A | 6/1989 | Gellert |
| 4,854,851 A | 8/1989 | Gellert |
| 5,049,062 A | 9/1991 | Gellert |
| 5,208,052 A | 5/1993 | Schmidt et al. |
| 5,299,928 A | 4/1994 | Gellert |
| 5,330,349 A | 7/1994 | Fukushima et al. |
| 5,378,139 A | 1/1995 | Schad et al. |
| 5,545,028 A | 8/1996 | Hume et al. |
| 5,658,604 A | 8/1997 | Gellert et al. |
| 5,674,439 A | 10/1997 | Hume et al. |
| 5,871,786 A | 2/1999 | Hume et al. |
| 5,879,727 A | 3/1999 | Puri |
| 5,885,628 A | 3/1999 | Swenson et al. |
| 6,022,210 A | 2/2000 | Gunther |
| 6,062,846 A * | 5/2000 | Kalemba .................... 425/549 |
| 6,074,195 A | 6/2000 | Belous |
| 6,309,207 B1 * | 10/2001 | Kalemba .................... 425/549 |
| 6,726,467 B1 | 4/2004 | Lefebure |

FOREIGN PATENT DOCUMENTS

| | | |
|---|---|---|
| CA | 2165514 | 6/1997 |
| CA | 2227085 | 7/1998 |
| DE | 41 00 939 A1 | 10/1991 |
| DE | 44 04 894 C1 | 1/1995 |
| DE | 196 52 047 A1 | 6/1997 |
| EP | 0 854 027 A1 | 7/1998 |
| EP | 0 646 449 B1 | 11/1999 |
| NL | 8004819 | 8/1980 |
| WO | WO 01/28750 A1 | 4/2001 |
| WO | WO 2004/035291 A1 | 4/2004 |

* cited by examiner

INJECTION NOZZLE SYSTEM

CROSS-REFERENCE TO RELATED APPLICATION

This application is a continuation of U.S. application Ser. No. 10/110,198, filed Apr. 17, 2002, that issued as U.S. Pat. No. 6,789,745, which is a national stage application of PCT Application No. PCT/CA00/01235, filed Oct. 17, 2000.

FIELD OF THE INVENTION

The present invention relates to injection molding and in particular to an injection nozzle system.

BACKGROUND OF THE INVENTION

Temperature control of the melt as it exits the tip of an injection nozzle is often critical to successful injection molding. If the temperature rises too high degradation of the melt will result and if the temperature falls too low the melt will clog up the system.

One approach to controlling the temperature of the melt at the tip of the nozzle is to divert the melt so that it exits the nozzle tip from a side opening (see for example U.S. Pat. No. 5,658,604 (Gellert)). The melt then collects in a gathering space surrounding the tip before it passes through the mold gate. The advantage of this approach is that the resulting greater mass of the tip below the side opening improves heat transfer from the tip to the melt collecting in the gathering space. A problem with this approach is that the diversion of the melt effects the even flow of the melt through the system. Also, the diversion through a side opening introduces the melt to relatively cooler surfaces of the melt plate that tend to cool the melt excessively.

It is also important that the nozzle tip be located accurately within the nozzle body to ensure that the respective melt channels align. Slight variances in the diameters of the nozzle tips and the bores of the nozzle bodies, or in the thread engagement between the nozzle body and nozzle tip, can lead to slight misalignments of the respective melt channels. Such misalignments can negatively effect the flow of melt through the nozzle.

SUMMARY OF THE INVENTION

The present invention provides an improved nozzle system that overcomes the problems discussed above.

In one aspect, the invention provides a nozzle tip for an injection molding machine, said nozzle tip comprising:

a body having a first portion and a second portion;

a melt channel extending from an inlet defined in said first portion to an opening defined in said second portion, a first section of said melt channel extending from said inlet along a first axis, a second section of said melt channel extending from said first section along a second axis that is inclined relative to said first axis and a third section of said melt channel extending from said second section along a third axis that is parallel to and eccentric from said first axis, wherein a straight through channel is defined in said melt channel parallel to said first axis from said inlet to said opening.

In another aspect, the invention provides a nozzle system for an injection molding machine, said nozzle system comprising:

a nozzle body defining a first melt channel and a bore along a common axis, said nozzle body having a first connector;

a nozzle tip defining a first portion sized to fit in said bore and a second portion for protruding from said bore, said nozzle tip defining a second melt channel;

a first tapered engagement surface defined on said second portion of said nozzle tip; and an alignment member having a cylindrical sleeve with a second connector for releasably connecting said aligrnent member to said first connector of said nozzle body, said alignment member defining an aperture coaxially with said cylindrical sleeve, said aperture having a second tapered engaging surface for engaging said first tapered engaging surface on said nozzle tip to locate said nozzle tip in said nozzle body with said first and second melt channels aligned along said common axis.

DESCRIPTION OF THE DRAWINGS

For a better understanding of the present invention, and to show more clearly how it may be carried into effect, reference will now be made by way of example to the accompanying drawings. The drawings show preferred embodiments of the present invention, in which:

FIGS. 3(*a*)–(*p*) are transverse sectional views of the nozzle tip of FIG. 1;

DETAILED DESCRIPTION OF THE PREFERRED EMBODIMENT

Figure 1:
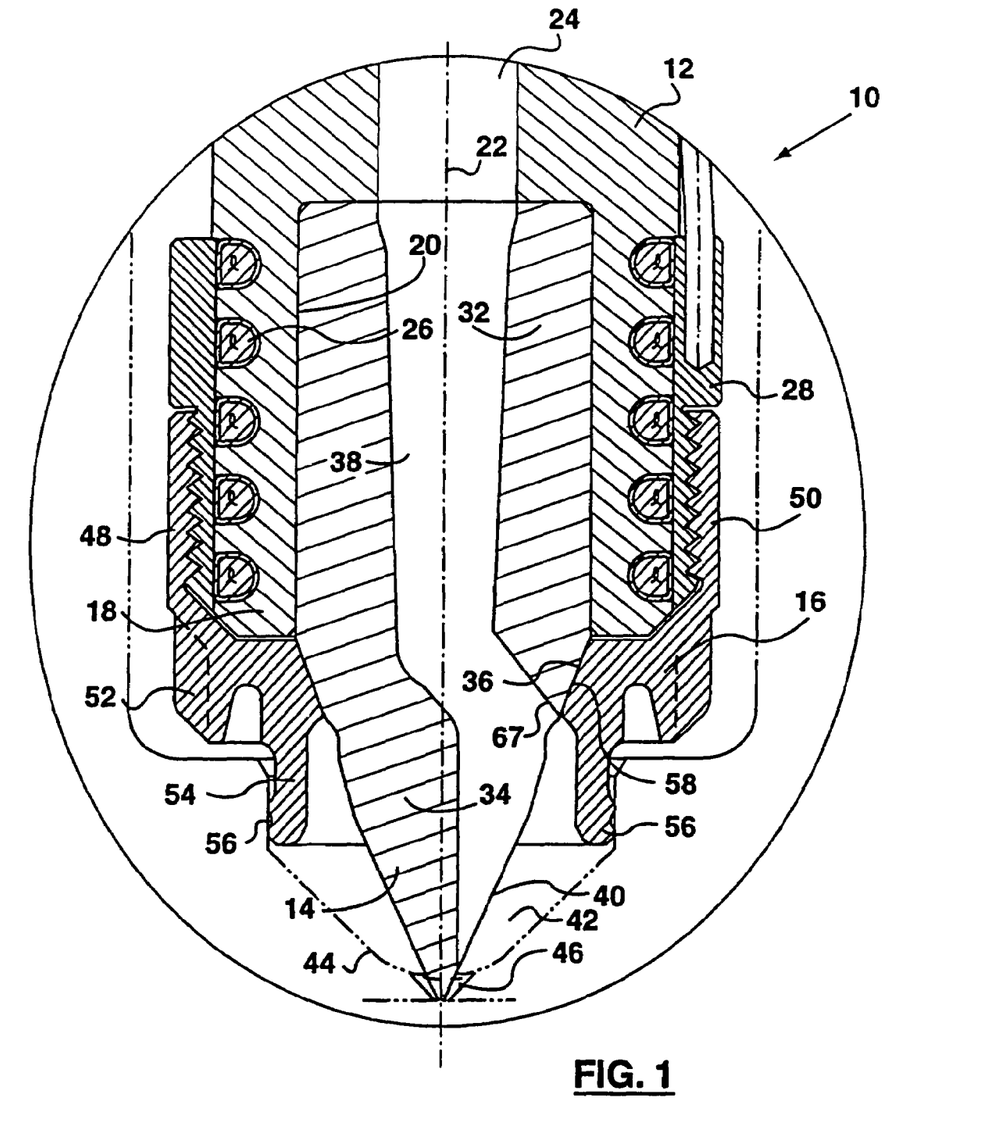
FIG. 1 is a partial cross sectional view of a nozzle system in accordance with the present invention.
Figure 2:
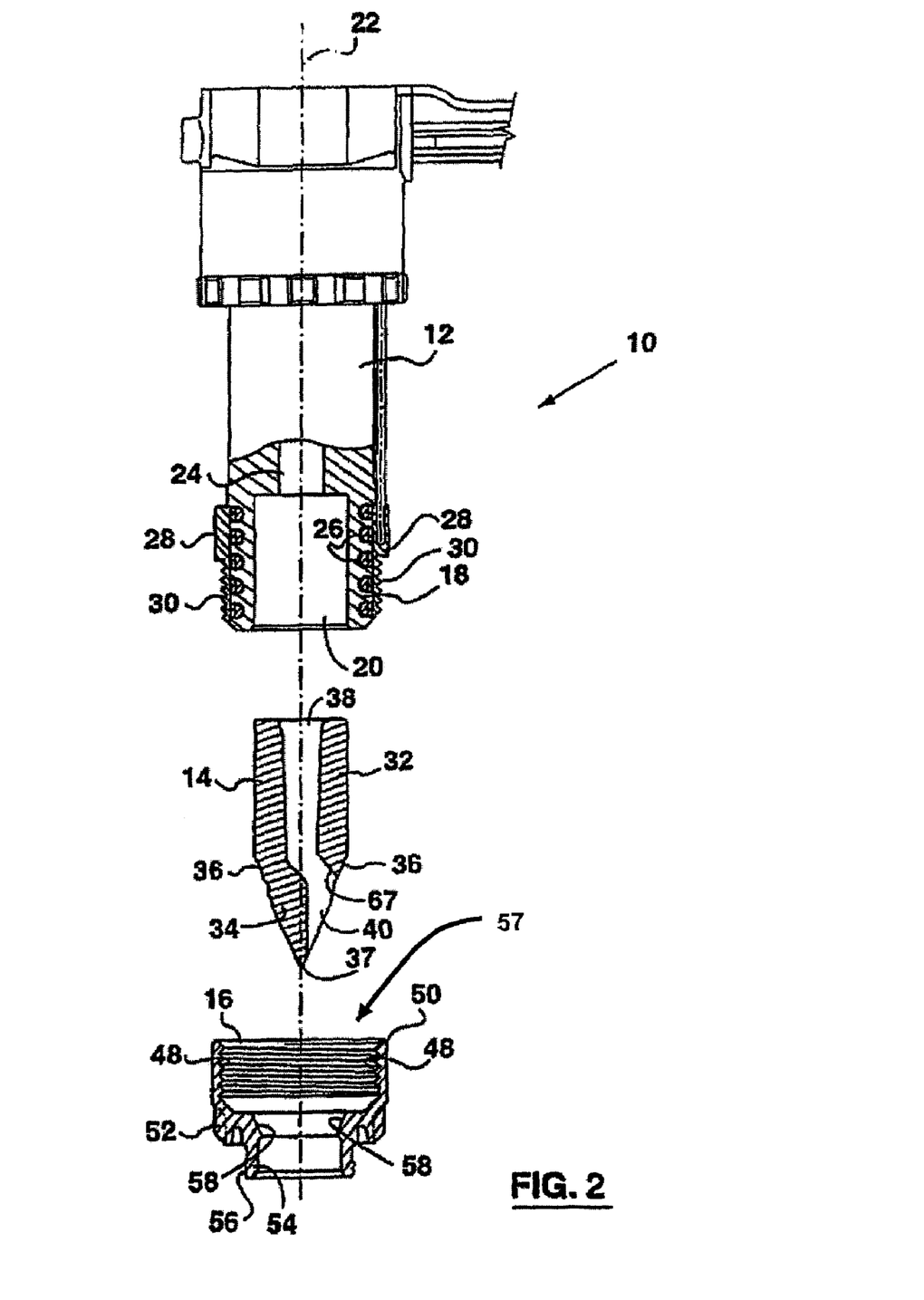
FIG. 2 is an exploded cross sectional view of the nozzle system of FIG. 1.

Referring to FIGS. 1 and 2, an injection nozzle system in accordance with the present invention is shown generally at 10. The nozzle system 10 includes a nozzle body 12, a nozzle tip 14 and an alignment member 16.

The nozzle system 10 is used with an injection molding machine (not shown) such as is shown and described in U.S. Pat. No. 5,658,604 (Gellert) which is hereby incorporated by reference.

Nozzle body 12 has an end 18 that defines a bore 20 along channel axis 22 for receiving the nozzle tip 14. A melt channel 24 is defined in the nozzle body 12 and opens at the bore 20. Electric heating element 26 extends about the outer circumference of the nozzle body 12 and is supported by a holder 28. A first connector 30 is disposed on the circumference of the nozzle body 12. Preferably, first connector 30 is an external thread however other suitable connecting means may be utilized. For instance, first connector 30 could be a rotatable collar defining an internal thread for connecting with a corresponding threaded element as described further below.

Nozzle tip 14 has a first portion 32 that is sized to fit within the bore 20 of the nozzle body 12. Nozzle body 12 also has a second portion 34 that protrudes from the end 18 of the nozzle body 12. Second portion 34 defines an outer engagement surface 36 that has opposing tapered walls and is preferably frusto-conical. The configuration of the second portion 34 below the outer engagement surface 36 is preferably conical ending in apex 37. A melt channel 38 is defined through nozzle tip 14 from the first portion 32 to the second portion 34. Melt channel 38 of nozzle tip 14 aligns with melt channel 24 of nozzle body 12 to permit the flow of pressurized melt from the nozzle body 12 to the nozzle tip 14. An opening 40 in the second portion 34 allows melt to pass from the nozzle tip 14 to a gathering space 42 defined in a mold plate 44 where it collects before entering a mold gate 46.

Alignment member 16 has a second connector 48 disposed on sleeve 50 to connect with first connector 30 to secure the nozzle tip 14 to the nozzle body 12. Second connector 48 is preferably an internal thread defined on the inner surface of sleeve 50 however other suitable connecting means may be utilized. For instance, second connector 48 may be an external thread defined on the outer surface of sleeve 50 to threadably engage with the rotatable collar type of first connector 30 on nozzle body 12 as described above.

A hexagonal flange 52 is disposed on the alignment member 16 to facilitate tightening or loosening the connection of alignment member 16 with the nozzle body 12. A sealing flange 54 is disposed on the alignment member 16 for contacting mold plate 44 to form a seal against pressurized melt leaking from the gathering space 42 to adjacent parts of the molding machine. Sealing flange 54 has an abutment face 56 that abuts against the surface of the mold plate 44 to form the desired seal.

Alignment member 16 also includes an aperture 57 defining an inner engagement surface 58 sized to receive second portion 34 of nozzle tip 14 and engage outer engaging surface 36. Inner engaging surface 58 has opposing tapered walls and is preferably frusto-conical. Inner engagement surface 58 is coaxial with sleeve 50 so that inner engagement surface 58 will be coaxial with bore 20 and melt channel 24 when alignment member 16 is mounted to nozzle body 12.

In use, inner engagement surface 58 of alignment member 16 engages outer engagement surface 36 of nozzle tip 14 to concentrically align melt channel 38 of nozzle tip 14 with melt channel 24 of nozzle body 12.

Figure 3:
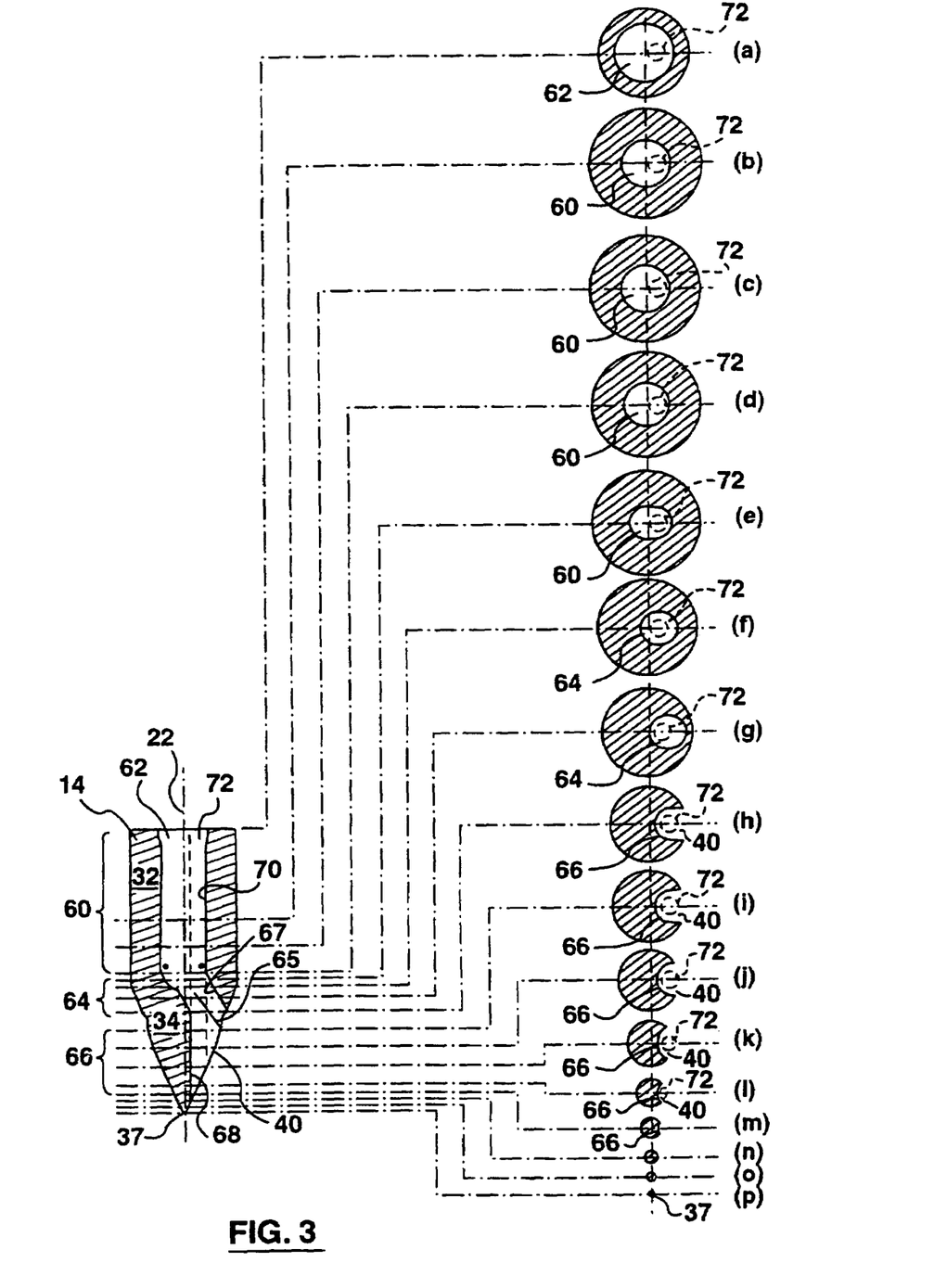

Referring to FIGS. 3(a)–(p), the structure of melt channel 38 defined through nozzle tip 14 may be better understood. Melt channel 38 has a first section 60 that extends along channel axis 22 through first portion 32 of nozzle tip 14. First section 60 decreases in cross sectional area from an inlet 62 to the beginning of second section 64. Second section 64 extends diagonally from channel axis 22 to third section 66. The cross sectional area of second section 64 remains relatively constant along its length. The upper wall 67 of the second section 64 terminates at the upper periphery of the opening 40. Third section 66 extends parallel to channel axis 22 to opening 40.

The channel wall 68 of third section 66 is located nearer to channel axis 22 than is the channel wall 70 of first section 60. Accordingly, a through channel 72 is defined parallel to channel axis 22 from inlet 62 to opening 40. Through channel 72 improves the flow of melt through melt channel 38 and reduces the occurrence of pressure drops. Through channel 72 also reduces heat losses in the melt as it enters the gathering space 42 by directing more melt centrally adjacent to the hotter nozzle tip 14 and less melt eccentrically towards cooler surfaces of the nozzle system 10 and mold plate 44. The structure of melt channel 38 thus optimizes the heat transfer provided by exposing the surface of the melt to the larger mass of the nozzle tip 14 with the reduced heat losses provided by directing melt away from cooler parts of the apparatus.

Figure 4:
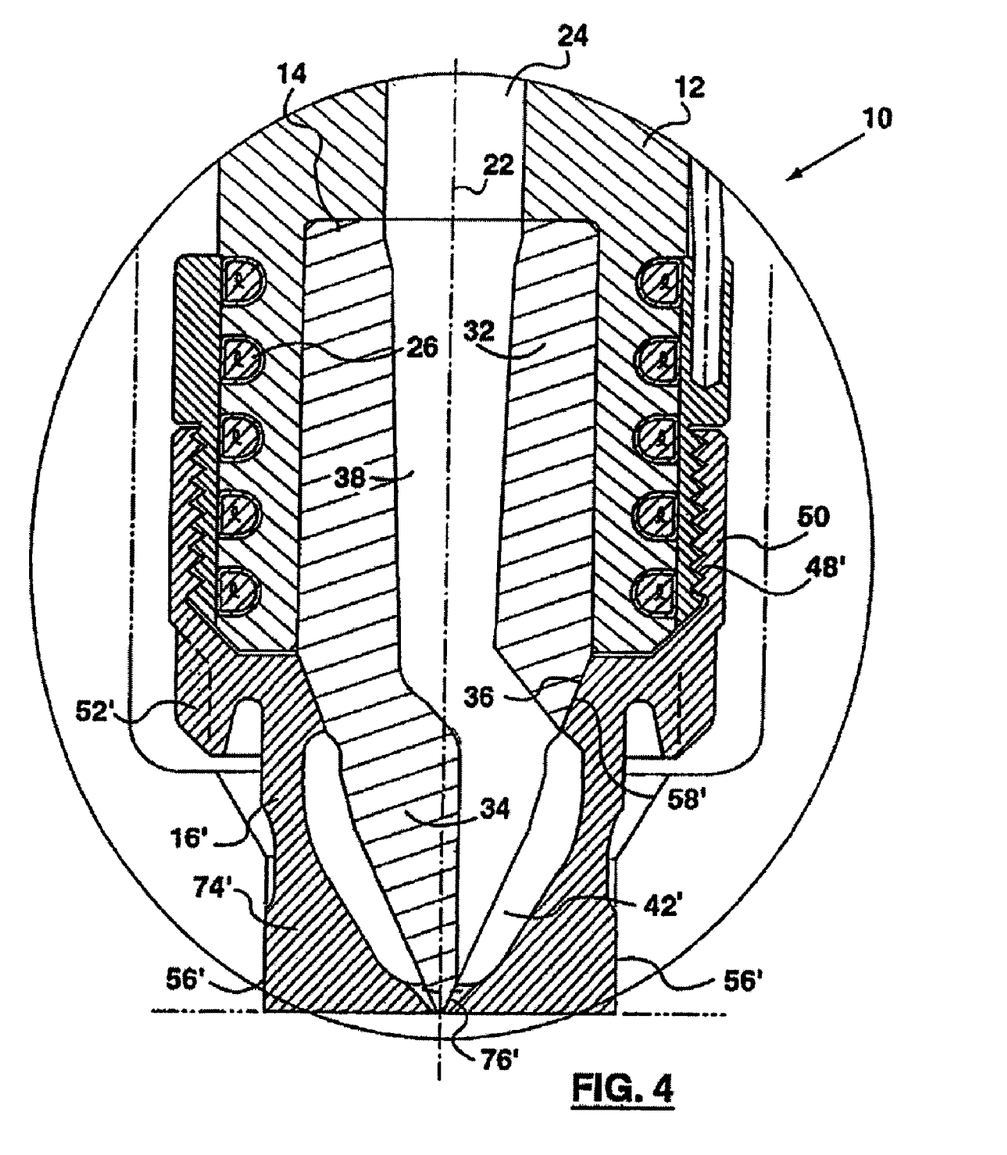
FIG. 4 is a partial cross sectional view of a nozzle system in accordance with a second embodiment of the present invention.

Referring to FIG. 4, a second embodiment of nozzle system 10 in accordance with the present invention is shown. Those elements of the nozzle system 10 that correspond with elements of the first embodiment of nozzle system 10 described above are assigned the same reference numerals and are not described in detail below.

The nozzle system 10 includes the same structure of nozzle body 12 and nozzle tip 14 as described above combined with a modified alignment member 16'. The modification to the alignment member 16' consists of the addition of an integral housing 74' defining a mold gate 76'. The integral housing 74' has a cavity that defines a gathering space 42' for collection of pressurized melt prior to it passing through mold gate 76'. Abutment face 56' is defined on the outer surface of housing 74' for contacting mold plate 44 to form a seal against pressurized melt leaking from the gathering space 42' to adjacent parts of the molding machine.

Figure 5:
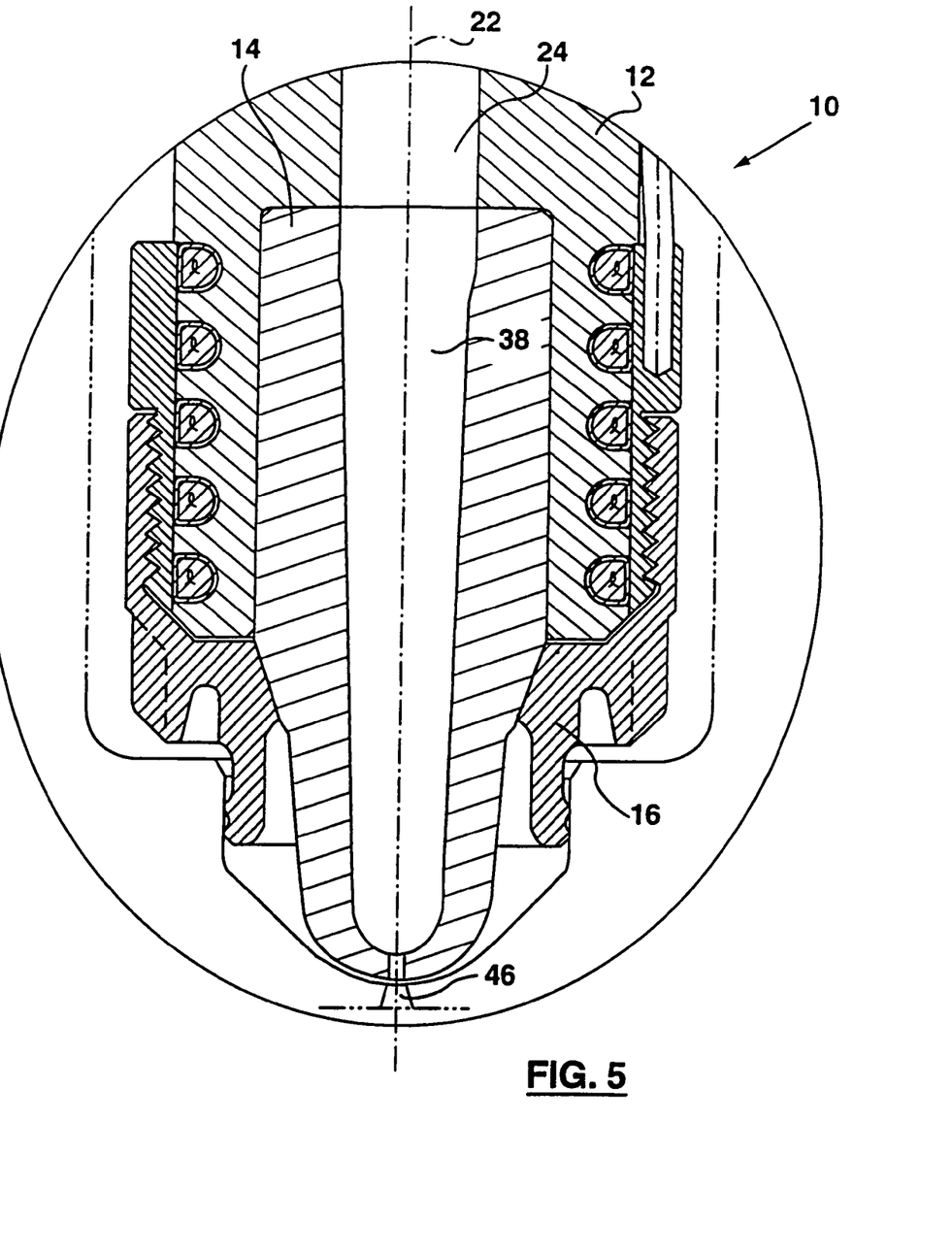
FIG. 5 is a partial cross sectional view of a nozzle system in accordance with the present invention, the system being utilized with a direct sprue gate.
Figure 6:
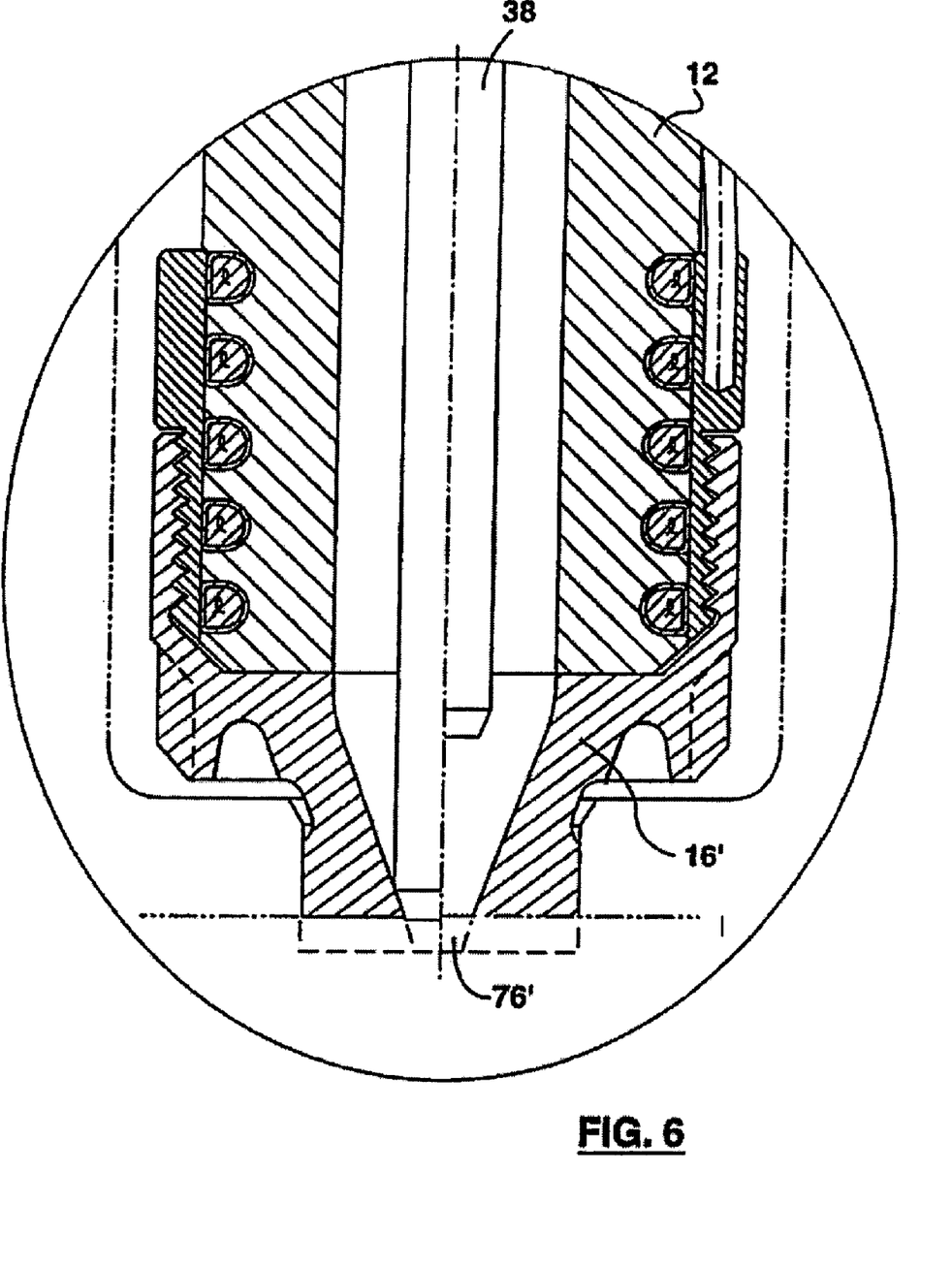
FIG. 6 is a partial cross sectional view of a nozzle system in accordance with the present invention, the system being utilized with a hot valve gate.
Figure 7:
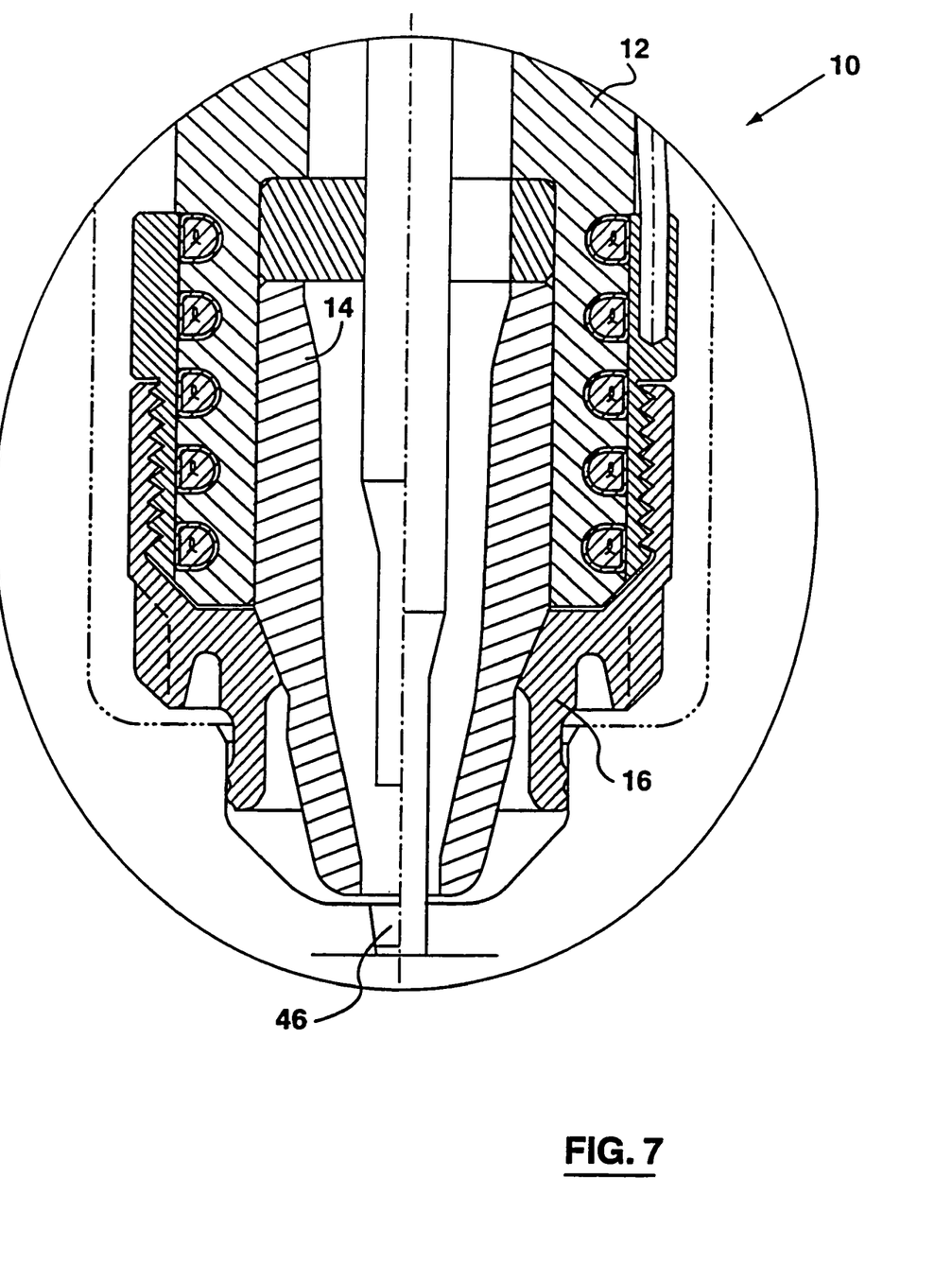
FIG. 7 is a partial cross sectional view of a nozzle system in accordance with the present invention, the system being utilized with a cylindrical valve gate.

The nozzle system 10 of the present invention is not limited to use with mold gates. The nozzle system 10, and in particular the alignment structures of the nozzle tip 14 and alignment member 16, 16', may be incorporated in a variety of alternative gate applications to accurately locate the respective melt channels 24 and 38. Examples are provided in FIGS. 5–7 which show use with a direct sprue gate (FIG. 5), a hot valve gate (FIG. 6) and a cylindrical valve gate (FIG. 7). For convenience, corresponding reference numerals have been assigned to corresponding elements described above.

The nozzle system 10 is made of materials having relatively high thermal conductivity. Nozzle body 12 and alignment member 16, 16' are preferably formed from titanium, H-13 or other suitable materials that may be obtained and manufactured at reasonable costs. Nozzle tip 14 is preferably formed of tungsten carbide due to its superior heat transfer properties although other thermally conductive materials may be utilized.

The above described embodiments of the invention are intended to be examples of the present invention and alterations and modifications may be effected thereto, by those of skill in the art, without departing from the scope of the invention which is defined solely by the claims appended hereto.

We claim:

1. A nozzle for an injection molding apparatus comprising:
   a nozzle body defining a body melt channel, the body melt channel being in fluid communication with a melt source;
   a nozzle tip comprised of:
      a first portion,
      a second portion downstream of the first portion,
      a tip melt channel, defined by the first and second portions of the nozzle tip, in fluid communication with the body melt channel, and extending to an opening defined in an end of the nozzle tip, the tip melt channel having a first section defined in the first portion of the nozzle tip, and a second section defined in the second portion of the nozzle tip, and
      a tapered outer engagement surface; and an alignment member surrounding the nozzle tip and removably coupled to the nozzle body, the alignment member defining an aperture having a tapered inner engagement surface, wherein the inner engagement surface of the alignment member is engaged with the outer engagement surface on the nozzle tip to align the first section of the tip melt channel with respect to the body melt channel, the alignment member further including a sealing flange having a cylindrical abutment face, wherein the abutment face abuts a cylindrical mold surface of a mold plate to seal against melt leakage proximate of a mold gate.

2. The nozzle of claim 1, wherein the alignment member is in contact with the mold plate only along the cylindrical abutment face of the sealing flange.

3. The nozzle of claim 1, wherein the alignment member is threadably engaged with the nozzle body.

4. The nozzle of claim 1, further comprising a first connector disposed along an outer surface of the nozzle body, and wherein the alignment member includes a second connector for releasably connecting the alignment member to the first connector.

5. The nozzle of claim 1, further comprising a heater thermally coupled to an outer surface of the nozzle body.

6. The nozzle of claim 5, wherein the nozzle body has a helical groove and the heater is fitted within the helical groove.

7. The nozzle of claim 1, wherein the second section of the tip melt channel is offset from the first section of the tip melt channel.

8. The nozzle of claim 1, wherein the abutment face abuts the cylindrical mold surface of the mold plate to form a melt gathering space.

9. A nozzle for an injection molding apparatus comprising:
   a nozzle body defining a body melt channel, the body melt channel being in fluid communication with a melt source;
   a nozzle tip comprised of:
      an upstream portion,
      a downstream portion downstream of the upstream portion,
      a tip melt channel, defined by the upstream and downstream portions of the nozzle tip, in fluid communication with the body melt channel, and extending to an opening defined in an end of the nozzle tip, the tip melt channel having a first section defined in the upstream portion of the nozzle tip, and a second section defined in the downstream portion of the nozzle tip, and
      an outer engagement surface; and
   an alignment member surrounding the nozzle tip and removably coupled to the nozzle body, the alignment member defining an aperture having an inner engagement surface, wherein the inner engagement surface of the alignment member is engagable with the outer engagement surface on the nozzle tip, the alignment member further including an integral housing defining a mold gate.

10. The nozzle of claim 9, wherein the outer engagement surface and the inner engagement surface are correspondingly tapered.

11. The nozzle of claim 9, wherein the alignment member is threadably engaged with the nozzle body.

12. The nozzle of claim 9, further comprising a first connector disposed along an outer surface of the nozzle body, and wherein the alignment member includes a second connector for releasably connecting the alignment member to the first connector.

13. The nozzle of claim 9, further comprising a heater thermally coupled to an outer surface of the nozzle body.

14. The nozzle of claim 13, wherein the nozzle body has a helical groove and the heater is fitted within the helical groove.

15. The nozzle of claim 9, wherein the second section of the tip melt channel is offset from the first section of the tip melt channel.

16. The nozzle of claim 9, wherein the integral housing defines a melt gathering space proximate to the mold gate.

17. A nozzle system for an injection molding machine comprising:
   a nozzle body defining a first melt channel and a bore along a common axis, the nozzle body including a first connector;
   a nozzle tip defining a first portion sized to fit in the bore and a second portion to protrude from the bore, the nozzle tip further defining a second melt channel, and having a first tapered engagement surface defined on the second portion of the nozzle tip; and
   an alignment member including a cylindrical sleeve with a second connector for releasably connecting the alignment member to the first connector of the nozzle body, the alignment member defining an aperture coaxial with the cylindrical sleeve, the aperture having a second tapered engagement surface for engaging the first tapered engagement surface on the nozzle tip, wherein a cylindrical abutment face is located on the alignment member to form a seal between the alignment member and a cylindrical surface of a mold plate to thereby form a gathering space adjacent to the nozzle tip for receiving a melt from the second melt channel.

18. The nozzle system of claim 17, wherein at least one of the engagement surfaces is frusto-conical.

19. The nozzle system of claim 17, wherein the alignment member includes a housing that defines a mold gate concentric with the nozzle tip.

20. The nozzle system of claim 17, wherein the nozzle body has a helical groove and a heater fitted within the helical groove.

21. The nozzle system of claim 17, wherein the alignment member is in contact with the mold plate only along the abutment face of the alignment member.

* * * * *